Jan. 24, 1956
H. THÜRLINGS
2,732,009
APPARATUS FOR BOILING A SUGAR MASS
Filed March 6, 1953
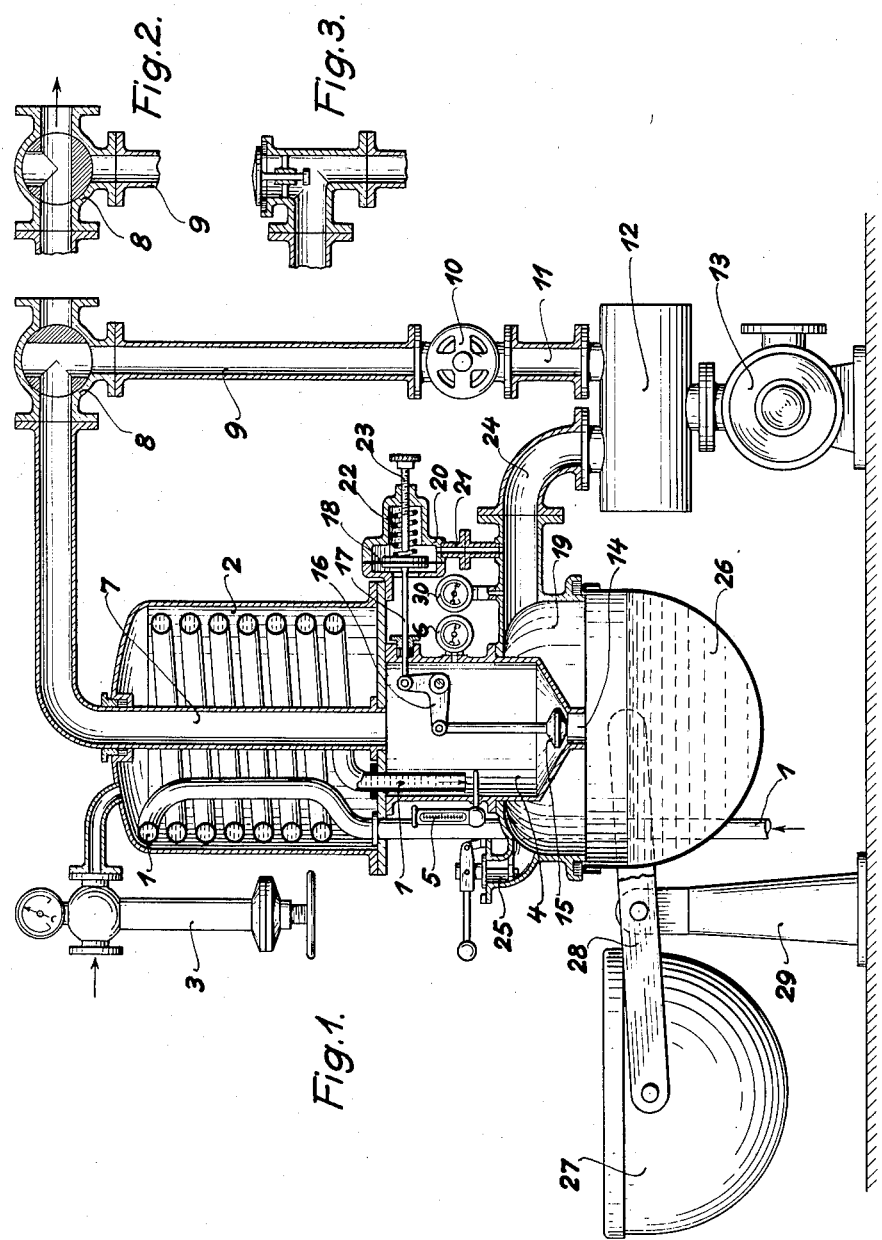
INVENTOR.
Hermann Thürlings
BY Freeman. Marmorek
His agents

United States Patent Office 2,732,009
Patented Jan. 24, 1956

2,732,009

APPARATUS FOR BOILING A SUGAR MASS

Hermann Thürlings, Viersen (Rhineland), Germany

Application March 6, 1953, Serial No. 340,806

Claims priority, application Germany October 17, 1952

2 Claims. (Cl. 159—44)

This invention relates to an apparatus for boiling a sugar mass.

In the manufacture of candies two methods of boiling sugar are commonly used.

One method consists in boiling the sugar under a vacuum, e. g. in a boiling coil terminating in a vacuum chamber. On account of the low temperature needed for boiling under vacuum, the sugar remains very clear, however, a relatively high quantity of sirup or inverting agents must be added to the sugar. The boiled sugar which is to be processed further is relatively tough.

The second method consists in boiling the sugar under atmospheric pressure. The boiled, still hot sugar mass is usually drawn into a vacuum chamber. Owing to the low evaporation temperature in a vacuum, the remaining water content of the sugar solution will evaporate without any further heating. The sugar remains less clear. The finished product, however, is more pliant than is the case with the former method. Besides, less sirup or a smaller amount of inverting agents have to be added.

According to the final use of the ready candy mass, the one or the other boiling method is preferred. Moreover, the relation between sugar and sirup prices is a leading consideration in choosing the boiling method.

It is an object of the present invention to enable either method of boiling as well as a combination of both methods to be used in one apparatus.

The apparatus according to the invention comprises three zones:

In the first zone the sugar solution flowing through continuously is heated to a controlled temperature. Preferably this is done by means of a boiling coil disposed in a steam chamber, but any other kind of continuous heater may be used as well.

The second zone comprises an intermediate chamber in which the boiling coil terminates. According to the invention means are provided for connecting this intermediate chamber optionally with the atmosphere or a vacuum pump. When said intermediate chamber communicates with the atmosphere, the sugar is boiled at a high temperature. When said chamber is connected to a vacuum pump the sugar is boiled at a lower temperature according to the vacuum reigning in the interior of the boiling coil. By throttling the communication between vacum pump and intermediate chamber, any degree of pressure below atmospheric may be produced in the latter chamber and boiling coil respectively which means using a method intermediate between the first and second method referred to above.

The intermediate chamber communicates with the third zone by means of a valve. The third zone comprises a discharge vessel which is on top covered by a hood. This hood is connected to a vacuum pump as usual.

Further objects and advantages of the present invention will be apparent from the following description, reference being made to the accompanying drawing whereinin a preferred embodiment of the present invention is clearly shown.

Fig. 1 of the drawing shows, partly in section, an apparatus according to the invention;

Fig. 2 is sectional view of a three-way valve in a different position, and

Fig. 3 is a sectional view of a further valve that may be substituted for the cone shown in Fig. 2.

In a conventional manner, the sugar solution to be thickened is pumped continuously through the boiling coil 1. Said boiling coil runs through the steam chamber 2. The steam is fed to the steam chamber through a reducing valve 3. The boiling coil terminates in the intermediate chamber 4. Adjacent the end of the boiling coil there is disposed a thermometer 5 measuring the temperature of the boiled solution. The pressure prevailing in the intermediate chamber 4 is measured by means of a vacuummeter 6.

As shown in Figure 1, the intermediate chamber 4 may, through the water vapor conduit 7, the three-way cock 8, the pipe 9, the throttle valve 10, the pipe 11 and the condenser 12, communicate with a vacuum pump 13 or with the atmosphere, when the three-way cock 8 is in the position shown in Figure 2.

From the intermediate chamber 4, the sugar flows out through the outlet opening 14. The outlet is controlled by means of a valve 15 which is operated, through the bent lever 16 and the drawing rod 17, by means of the membrane 18. The membrane casing 20 being connected to the hood 19 by means of the conduit 21, the membrane is sucked in owing to the sub-atmospheric pressure prevailing in the hood 19. The spring 22 keeps the valve 15 in a closed position, when there is no sub-atmospheric pressure in the hood 19. By means of the spindle 23, the stroke of the valve 15 may be limited.

Through the conduit 24 and the condenser 12, the hood 19 communicates with the vacuum pump 13. The vacuum in the hood 19 may be broken by means of the air valve 25. On its lower side, the hood 19 is closed by the discharge vessel 26 which sticks to the hood as long as there is sub-atmospheric pressure within the hood. When the vacuum is broken, the discharge vessel 26 will be loosened and may be replaced by the discharge vessel 27. In a conventional manner, the discharge vessels 26 and 27 are mounted on a balance 28 which is capable of being swung round the column 29. The pressure prevailing within the hood 19 and a discharge vessel respectively is measured by means of the vacuummeter 30.

Boiling in the apparatus goes on as follows:

To boil the sugar under vacuum the valve 15 is wide opened by loosening the spindle 23; the three-way cock is in the position shown in Figure 1, and the throttle valve 10 is wide open. In the intermediate chamber 4 there is now prevailing the same pressure below atmospheric as within the hood 19 and the discharge vessel 26 respectively. As, in addition, the interior of the boiling coil 1 is under vacuum, the sugar is boiled under vacuum. The boiling temperature may be low. A relatively large quantity of sirup or inverting agents is required, and the candy mass produced is tough.

To boil the sugar under normal pressure the three-way cock is given the position shown in Figure 2. The stroke of the valve 15 is so limited by spindle 23 as to allow the ready boiled sugar only to pass the discharge vessel, while the water vapor is let out to the open air through the water vapor conduit 7. Atmospheric pressure prevails within the intermediate chamber. The boiling of the sugar is finished without applying a vacuum, and not before this has been done will the sugar be exhausted into the vacuum space formed by the hood 19 and the discharge vessel 26. As boiling goes on under atmospheric pressure, a high boiling temperature is necessary, whereas a relatively small quantity of sirup or inverting agents is required. Although the sugar does not remain so clear as the sugar boiled under vacuum, it will be more pliant.

In both boiling methods the discharge vessels can be exchanged in the same way. The air valve 25 is opened to break the vacuum within the hood 19, the valve 15, therefore, closes, and the filled discharge vessel 26 is replaced by the empty vessel 27. The space within the hood 19 will be evacuated by means of the vacuum pump. The valve 15, therefore, will be opened thus giving the sugar again access to the discharge vessel. During the exchange of the discharge vessels, there is collected in the intermediate chamber 4 a small quantity of sugar which will quickly run out into the discharge vessel, when the valve 15 is opened.

By placing the three-way cock 8 in the position shown in Figure 1 and by throttling the valve 10, it is possible to produce any required intermediate pressure between vacuum and atmospheric pressure in the intermediate chamber 4 and, in this way, to provide evacuation in two steps. The degree of exhaustion will then be lower in the intermediate chamber 4 and in the boiling coil 1 than it is in the discharge vessel. This lower degree of exhaustion, however, will be sufficient to reduce the boiling temperature to such a degree that the sugar will remain relatively clear, but the ready candy mass will become sufficiently pliant. It is this intermediate adjustment which ensures obtaining such a candy mass as is generally preferred in the manufacture of candies.

Instead of the three-way cock 8 as shown in Figs. 1 and 2, a back pressure valve as illustrated in Fig. 3 may be used as well. Such a back pressure valve automatically closes the water vapor conduit 7 against the atmosphere, when the throttle valve 10 is wholly or partly opened and, therefore, pressure below atmospheric is prevailing in the water vapor conduit. When the throttle valve 10 is closed, the water vapor of the intermediate chamber 4 escapes to the atmosphere through the back pressure valve.

What I claim is:

1. Apparatus for boiling sugar solutions comprising a continuously operable heater for a sugar solution to be thickened, a coil for receiving the sugar solution and boiling it, said coil being disposed in said heater, a vessel for receiving the heated sugar solution and for discharging it therefrom, an intermediate chamber disposed between said heater and said vessel, said coil having a free end discharging into said intermediate chamber for supplying the heated sugar solution thereto, a bottom opening in said intermediate chamber for discharging the heated sugar solution into said vessel, a valve for controlling said bottom opening, a vacuum pump in communication with said vessel, a conduit connecting said intermediate chamber to said vacuum pump, three-way valve means disposed in said conduit for selectively connecting said intermediate chamber either to said vacuum pump or to atmosphere, and a throttling device provided in said conduit between said valve means and said vacuum pump, whereby the pressure in said intermediate chamber may be adjusted to any desired value between that of said vacuum pump and atmospheric.

2. Apparatus for boiling sugar solutions comprising a continuously operable steam chamber, a coil disposed in said steam chamber and adapted to receive a sugar solution for boiling it, a discharge vessel for receiving the heated sugar solution and for discharging it therefrom, an intermediate chamber disposed between said vessel and said steam chamber, said coil having a discharge end terminating in said intermediate chamber for discharging the heated sugar solution into said intermediate chamber, a bottom opening in said intermediate chamber for permitting the heated sugar solution to discharge into said discharge vessel, a valve in said bottom opening, means associated with said valve for opening the valve in response to a predetermined pressure differential between said discharge vessel and said intermediate chamber, a vacuum pump in communication with said discharge vessel, a conduit connecting said vacuum pump to said intermediate chamber, a three-way cock in said conduit for selectively connecting said intermediate chamber either to said vacuum pump or to atmosphere, and a throttle valve disposed in said conduit between said cock and said vacuum pump, whereby the pressure in said intermediate chamber may be adjusted to any desired value between that of said vacuum pump and atmospheric.

References Cited in the file of this patent

UNITED STATES PATENTS

| 956,508 | Baker | May 3, 1910 |
| 1,897,745 | Williams | Feb. 14, 1933 |

FOREIGN PATENTS

| 265,127 | Great Britain | Oct. 19, 1927 |